United States Patent Office 2,772,250
Patented Nov. 27, 1956

2,772,250

ACRYLONITRILE POLYMERS STABILIZED WITH SALTS OF VINYL SULFONIC ACID

Robert J. Slocombe, Dayton, Ohio, assignor to Monsanto Chemical Company, St. Louis, Mo., a corporation of Delaware No Drawing. Application June 14, 1954,
Serial No. 436,712

8 Claims. (Cl. 260—45.7)

This invention relates to methods of preparing polymers of acrylonitrile which are stabilized with respect to thermodiscoloration. More specifically the invention relates to methods of converting unstable polymers of acrylonitrile into color-stable polymers.

Although polyacrylonitrile and copolymers of 50 percent or more by weight of acrylonitrile and other monomers containing olefinic unsaturation copolymerized therewith, are generally regarded as being materials of good thermostability, they are subject to discoloration. This phenomenon generally results because of the need for extruding and molding the composition at elevated temperatures. Furthermore the higher acrylonitrile polymers find extensive use in the fabrication of fibers, films and fabrics which frequently are subjected to ironing operations at elevated temperatures. Thus, serious discolorations are often developed in the fabrication and processing of acrylonitrile polymers.

The primary purpose of this invention is to provide color-stable polymers of acrylonitrile. A further purpose of the invention is to facilitate molding and other processing procedures usually encountered at elevated temperatures. A still further purpose of the invention is to provide substances which can be added to conventional polymers to induce resistance to heat and discoloration.

It has been discovered that by adding certain salts of vinyl sulfonic acid to acrylonitrile polymers improved resistance to discoloration may readily be developed. The nature of the chemical reaction involved is not definitely understood, but it is believed that the color change is due to some impurities present in the polymer. It may be that the salts of vinyl sulfonates react with the impurity to form a substance which contributes to less themodiscoloration than the impurity in its original form. The total stabilization may involve additive or synergistic effects.

The acrylonitrile polymers with which this invention may be practiced include polyacrylonitrile and copolymers of from 20 or more percent acrylonitrile and up to 80 percent of one or more of a wide variety of other unsaturated substances known to be copolymerizable with the acrylonitrile. Thus, the invention is practicable with the well-known fiber-forming copolymers of acrylonitrile, which may be the copolymers of 75 percent or more percent of arcylonitrile and up to 25 percent of other monomers. Other copolymers of from 20 percent to 80 percent acrylonitrile and 80 to 20 percent of the various other monomers, which copolymers have primary utility in the field of film and molding composition production, are also useful.

The said other monomers with which the acrylonitrile may be copolymerized to produce resinous substances capable of use in the practice of this invention include vinyl acetate and other vinyl esters of monocarboxylic acids having up to four carbon atoms in the carboxylic acid radical, dimethyl maleate and dimethyl fumarate and other alkyl esters of fumaric and maleic acids, wherein the alkyl radical has up to four carbon atoms, methyl methacrylate or acrylate and other alkyl acrylates and alkyl methacrylates wherein the alkyl radical has up to four carbon atoms, vinyl chloride and other vinyl halides, styrene, alpha-methylstyrene and other vinyl and isopropenyl substituted aromatic hydrocarbons, methacrylonitrile, vinylidene chloride, vinylpyridine, the vinyl derivatives of other alkyl substituted pyridines, and the vinyl derivatives of other compounds containing a tertiary amino atom in a heterocyclic ring, vinyl chloroacetate and other vinyl esters of haloacetic acids, methallyl, chloroacetate, allyl chloroacetate and chloroallylchloroacetate, and the corresponding esters of other haloacetic esters, vinylimidazole and other N-vinyl derivatives of heterocyclic nitrogen compounds, and one or more of these and other unsaturated compounds known to be copolymerizable with acrylonitrile.

The salts of vinyl sulfonic acid which are useful in the practice of this invention include sodium, calcium and magnesium vinyl sulfonate. In the practice of this invention the sodium, calcium or magnesium may be used to the extent of 0.01% to 10% by weight of the acrylonitrile polymer to be stabilized. Preferred practice of this invention involves the use of 0.1% to 3% of the stabilizer.

The invention may be practiced by combining the acrylonitrile polymer and the desired salt by a wide variety of mechanical procedures. Thus, the polymer may be treated in granular solid form and mixed physically with the solid salt or an aqueous or other liquid solution or dispersion of the salt. The physical mixture may take place at room temperature or at higher temperatures, for example the temperature at which the polymer is semi-solid or fluid. A preferred practice involves the use of solvents or plasticizers for the acrylonitrile polymers in the presence of which the intimate dispersing of the stabilizing additive and the acrylonitrile polymer is more readily effected. The nature of the solvent which is useful in dissolving or softening the acrylonitrile polymer will to a large extent depend upon the chemical composition of the acrylonitrile polymers.

The copolymers of 75 percent or more of acrylonitrile and up to 25 percent of the comonomer are well-known fiber forming compositions and are generally resistant to the effect of many chemical solvents. In the preparation of solutions of such copolymers, solvents, such as N,N-dimethylformamide, N,N-dimethylacetamide, gamma-butyrolacetone, ethylene carbonate, maleic acid, alpha-cyanoacetamide, and tris(dimethylamido) phosphate may be used.

In the treatment of the more soluble types of acrylonitrile polymers, for example those of from 20 percent to 75 percent acrylonitrile and from 25 percent to 80 percent of other monomers copolymerizable therewith, the selection of a solvent is less critical. This type of copolymer may be dissolved or otherwise physically effected by the various ketones, esters and aromatic hydrocarbon types of solvents. In general, the copolymer is placed in a suitable solution, or softened and swelled by the selected medium so as to enable a more ready dispersion of the stabilizer within the solid polymer. Obviously a solvent which is also capable of dissolving at least to some extent the desired salt to be used will be exceptionally beneficial. However, the selection of the dispersing agent, the stabilizing agent and the particular method of dispersing the salt in the solid polymer is a matter readily determined by one skilled in the art.

To evaluate the stabilizing action of various compounds, polyacrylonitrile was used and the desired salts dispersed therein.

Example

Polyacrylonitrile as a solid granular polymer was used in aqueous slurries with the stabilizers provided as separate mixtures in concentrations corresponding to 2%, 5% and 10% by weight of calcium vinyl sulfonate and magnesium vinyl sulfonate. Blank tests without stabilizers were also conducted. The salt was incorporated into the polyacrylonitrile by dissolving the salt in 10–20 cc. of water, followed by mixing with 1.0 g. of the granular polyacrylonitrile. The water was then removed by evaporation on a steam bath, after which the polymer samples were dried overnight at 110° C.

In order to test the samples for thermal stability, the dried polyacrylonitrile samples, as prepared above, were placed in test tubes and stirred in a constant temperature bath maintained at 225° C. The samples were maintained at this elevated temperature for a period of 10 minutes, after which the polymer samples were arranged in order of increasing darkness or depth of color as indicative of thermal degradation. The color scale was based upon 6 standards as follows:

1. Very light cream
2. Light cream
3. Cream
4. Beige
5. Tan
6. Brown

The results obtained are summarized below:

| Stabilizer | Stabilizer Concentration | | |
|---|---|---|---|
| | 2% | 5% | 10% |
| Calcium vinyl sulfonate | 3 | 2 | 1 |
| Magnesium vinyl sulfonate | 4 | 4 | 2 |
| Blank | 6 | 6 | 6 |

What is claimed is:

1. A stable acrylonitrile polymer comprising a polymer of 20% to 100% of acrylonitrile and up to 80% of another monoolefinic monomer copolymerized therewith, said polymer containing intimately dispersed therein from 0.01% to 10% of a salt of vinyl sulfonic acid selected from the group consisting of calcium vinyl sulfonate, magnesium vinyl sulfonate, strontium vinyl sulfonate, aluminum vinyl sulfonate and sodium vinyl sulfonate.

2. A stable acrylonitrile polymer comprising a polymer of 20% to 100% of acryonitrile and up to 80% of another monoolefinic monomer copolymerized therewith, said polymer containing intimately dispersed therein from 0.1% to 3% of a salt of vinyl sulfonic acid selected from the group consisting of calcium vinyl sulfonate, magnesium vinyl sulfonate, strontium vinyl sulfonate, aluminum vinyl sulfonate and sodium vinyl sulfonate.

3. A stable acrylonitrile polymer comprising a polymer of 20% to 100% of acrylonitrile and up to 80% of another monoolefinic monomer copolymerized therewith, said polymer containing intimately dispersed therein from 0.01% to 10% of an alkaline earth vinyl sulfonate.

4. A stable acrylonitrile polymer comprising a polymer of 20% to 100% of acrylonitrile and up to 80% of another monoolefinic monomer copolymerized therewith, said polymer containing intimately dispersed therein from 0.1% to 3% of an alkaline earth vinyl sulfonate.

5. A stable acrylonitrile polymer comprising a polymer of 20% to 100% of acrylonitrile and up to 80% of another monoolefinic monomer copolymerized therewith, said polymer containing intimately dispersed therein from 0.01% to 10% of calcium vinyl sulfonate.

6. A stable acrylonitrile polymer comprising a polymer of 20% to 100% of acrylonitrile and up to 80% of another monoolefinic monomer copolymerized therewith, said polymer containing intimately dispersed therein from 0.1% to 3% of calcium vinyl sulfonate.

7. A stable acrylonitrile polymer comprising a polymer of 20% to 100% of acrylonitrile and up to 80% of another monoolefinic monomer copolymerized therewith, said polymer containing intimately dispersed therein from 0.01% to 10% of magnesium vinyl sulfonate.

8. A stable acrylonitrile polymer comprising a polymer of 20% to 100% of acrylonitrile and up to 80% of another monoolefinic monomer copolymerized therewith, said polymer containing intimately dispersed therein from 0.1% to 3% of magnesium vinyl sulfonate.

References Cited in the file of this patent

UNITED STATES PATENTS

| | | |
|---|---|---|
| 2,560,053 | Webb | July 10, 1951 |
| 2,661,345 | Slocombe et al. | Dec. 1, 1953 |

OTHER REFERENCES

American Journal of Chemistry (A. J. C.), vol. 20, 1898, page 680.